(12) United States Patent
Jain et al.

(10) Patent No.: US 10,397,594 B2
(45) Date of Patent: Aug. 27, 2019

(54) REAL-TIME PROCESSING OF IOT DATA (71) Applicant: HEWLETT PACKARD ENTERPRISE DEVELOPMENT LP, Houston, TX (US)

(72) Inventors: Puneet Jain, Palo Alto, CA (US); Kyu Han Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 50 days.

(21) Appl. No.: 15/582,235

(22) Filed: Apr. 28, 2017

(65) Prior Publication Data
US 2018/0316928 A1 Nov. 1, 2018

(51) Int. Cl.
*H04N 19/46* (2014.01)
*G06N 99/00* (2019.01)
(Continued)

(52) U.S. Cl.
CPC ........... *H04N 19/46* (2014.11); *G06K 9/6269* (2013.01); *G06N 20/00* (2019.01); *G11B 27/00* (2013.01);
(Continued)

(58) Field of Classification Search
CPC ........................ G06N 99/005; G06F 17/30321
See application file for complete search history.

(56) References Cited

U.S. PATENT DOCUMENTS

2006/0136597 A1* 6/2006 Shabtai ............ H04L 29/06027
709/231

2011/0044533 A1* 2/2011 Cobb ................. G06K 9/00771
382/155
(Continued)

FOREIGN PATENT DOCUMENTS

WO WO-2014186719 A1 11/2014
WO 2016/005912 A2 1/2016
(Continued)

OTHER PUBLICATIONS

Fujisawa Kazuki et al: Automatic Content Curation System for a Multiple Live Sport Video Streams; 2015 IEEE International Symposium on Multimedia (ISM), Dec. 14, 2015. pp. 541-546 XP032886824.
(Continued)

*Primary Examiner* — Mainul Hasan
(74) *Attorney, Agent, or Firm* — Hewlett Packard Enterprise Patent Department (57) ABSTRACT

A method is provided for real-time processing of IoT data. For example, a first physical processor of an edge computing device may receive a set of data from a first IoT device communicably coupled to the edge device. The first physical processor may split the set of data into a set of individual data packets. A second physical processor of the edge device process the set of individual data packets by: concurrently applying, by a plurality of instances of the second physical processor of the edge computing device, a learning model to each of a corresponding plurality of data packets from the set of individual data packets; and annotating, by a subset of the plurality of instances of the second physical processor, a corresponding subset of the plurality of data packets with a corresponding output from the concurrent application of the learning model.

17 Claims, 5 Drawing Sheets

(51) Int. Cl.
  *G06K 9/62* (2006.01)
  *H04N 19/172* (2014.01)
  *H04N 19/436* (2014.01)
  *G06N 20/00* (2019.01)
  *H04L 29/06* (2006.01)
  *H04L 29/08* (2006.01)
  *G11B 27/00* (2006.01)
  *H04N 21/845* (2011.01)
  *H04W 4/70* (2018.01)

(52) U.S. Cl.
  CPC ............ *H04L 65/605* (2013.01); *H04L 67/12* (2013.01); *H04L 67/2819* (2013.01); *H04N 19/172* (2014.11); *H04N 19/436* (2014.11); *H04N 21/845* (2013.01); *H04W 4/70* (2018.02)

(56) References Cited

U.S. PATENT DOCUMENTS

| | | | |
|---|---|---|---|
| 2014/0006822 A1* | 1/2014 | Diab | G06F 1/3206 713/322 |
| 2014/0380264 A1 | 12/2014 | Misra et al. | |
| 2015/0016249 A1* | 1/2015 | Mukundan | H04L 47/125 370/230 |
| 2015/0055623 A1 | 2/2015 | Li et al. | |
| 2015/0134954 A1 | 5/2015 | Walley et al. | |
| 2015/0324568 A1 | 11/2015 | Publicover et al. | |
| 2015/0363693 A1 | 12/2015 | Caplan et al. | |
| 2016/0191779 A1 | 6/2016 | Yang et al. | |
| 2017/0006141 A1 | 1/2017 | Bhadra | |
| 2017/0083386 A1 | 3/2017 | Wing et al. | |
| 2018/0032908 A1* | 2/2018 | Nagaraju | G06N 20/00 |

FOREIGN PATENT DOCUMENTS

WO    2016/059122 A1    4/2016
WO    WO-2016162678 A1    10/2016

OTHER PUBLICATIONS

Satyanarayanan et al., "Edge Analytics in the Internet of Things", IEEE Pervasive Computing, vol. 14, Issue 2, Apr.-Jun. 2015, 8 pages.
Redmon et al., "You Only Look Once:Unified, Real-Time Object Detection", available online at <https://pjreddie.com/darknet/yolo/>, retrieved on Nov. 5, 2018, 10 pages.
Kazuki et al., "Automatic Content Curation System for Multiple Live Sport Video Streams", IEEE International Symposium on Multimedia (ISM), 2015.
IntelliVision, "Smart Home/IoT Solution", 2 pages.
Extended European Search Report and Written Opinion received for EP Patent Application No. 18167189.2, dated Sep. 21, 2018, 9 pages.
Bradley et al., "Embracing the Internet of Everything to Capture Your Share of $14.4 Trillion", Cisco, White Paper, 2013, 18 pages.
"Py-faster-rcnn", available online at <https://github.com/rbgirshick/py-faster-rcnn>, retrieved on Nov. 5, 2018, 8 pages.
"More than 50 billion connected devices", Ericsson White Paper, 284 23-3149 Uen, Feb. 2011, 12 pages.
"IBM Intelligent Video Analytics", available online at <https://www.ibm.com/us-en/marketplace/video-analytics-for-security>, retrieved on Nov. 5, 2018, 5 pages.
"Caffe", available online at <http://caffe.berkeleyvision.org/>, retrieved on Nov. 5, 2018, 5 pages.
"Amazon Elastic Transcoder", available online at <https://aws.amazon.com/elastictranscoder/>, retrieved on Nov. 5, 2018, 8 pages.
"Affordable and powerful video encoding platform", available online at <https://coconut.co/video-transcoding>, retrieved on Nov. 5, 2018, 4 pages.

* cited by examiner

REAL-TIME PROCESSING OF IOT DATA

BACKGROUND

The use of Internet of Things ("IoT") devices is increasing at a rapid pace, with a corresponding increase in the amount of data being processed by these devices. Processing of data from IoT devices may involve sending data from an IoT device to an edge device communicably coupled to the IoT device, and then to a server on a cloud network communicably coupled to the edge device. Processing data from a plurality of IoT devices may incur network latency and computation latency issues.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The foregoing disclosure describes a number of example implementations for real-time processing of Internet of Things ("IoT") data. The disclosed examples may include systems, devices, computer-readable storage media, and methods for real-time processing of IoT data. For purposes of explanation, certain examples are described with reference to the components illustrated in FIGS. 1-4. The functionality of the illustrated components may overlap, however, and may be present in a fewer or greater number of elements and components.

Figure 3:
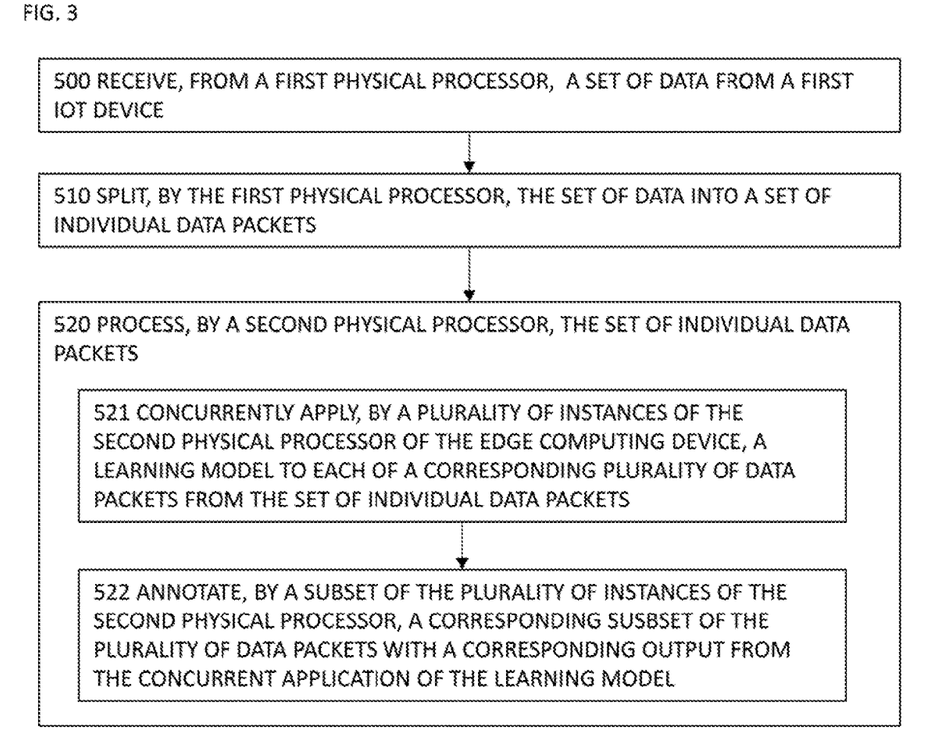
FIG. 3 is a flow diagram depicting an example method for real-time processing of IoT data.
Figure 4:
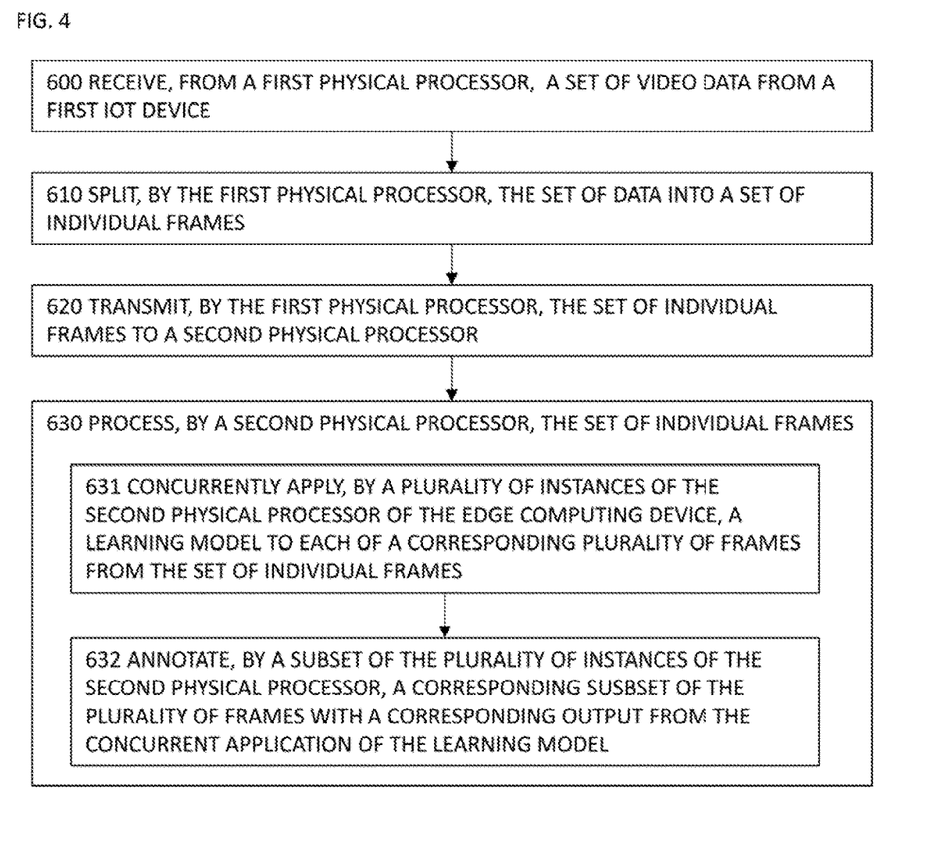
FIG. 4 is a flow diagram depicting an example method for real-time processing of IoT data.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 3-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The use of Internet of Things ("IoT") devices is increasing at a rapid pace, with a corresponding increase in the amount of data being processed by these devices. Processing of data from IoT devices may involve sending data from an IoT device to an edge device communicably coupled to the IoT device, and then to a server on a cloud network communicably coupled to the edge device. Processing data from a plurality of IoT devices may incur network latency and computation latency issues.

Of note is the increase in live video feeds from IoT devices. Live video feeds, and other data with similarly high payloads may be timely and costly to process. For example, IoT cameras are able to generate megabytes of visual data every second. Due to their geographical location, offloading the entire set of data captured by an IoT device in real time to an edge device and then to a server device in the cloud may not be possible and may incur significant delays, in addition to incurring a significant bandwidth cost. Reducing the resolution for real-time transfer is also not ideal, as it makes the processing and analysis of that data more difficult. Existing solutions to process complex data from IoT devices are either built into hardware (thus increasing the cost and complexity of the hardware involved) or edge devices perform minimal lightweight processing before the data is sent to a server in the cloud network.

A technical solution to these technical challenges may efficiently process complex data from IoT devices on the connected edge devices and distribute the data and processed results to servers in the cloud network. In particular, a technical solution to these technical challenges may leverage an architecture pipeline in the edge device to process and derive insights from the complex data.

Examples discussed herein address these technical challenges by providing a technical solution that provides real-time processing of IoT data. For example, the technical solution may receive, by a first physical processor of an edge computing device, a set of data from a first IoT device communicably coupled to the edge device. The set of data may be split into a set of individual data packets and processed by a second physical process of the edge device. The set of individual data packets may be processed, for example, by concurrently applying, by a plurality of instances of the second physical processor of the edge computing device, a learning model to each of a corresponding plurality of data packets from the set of individual data packets, and annotating, by a subset of the plurality of instances of the second physical processor, a corresponding subset of the plurality of data packets with a corresponding output from the concurrent application of the learning model.

Figure 1:
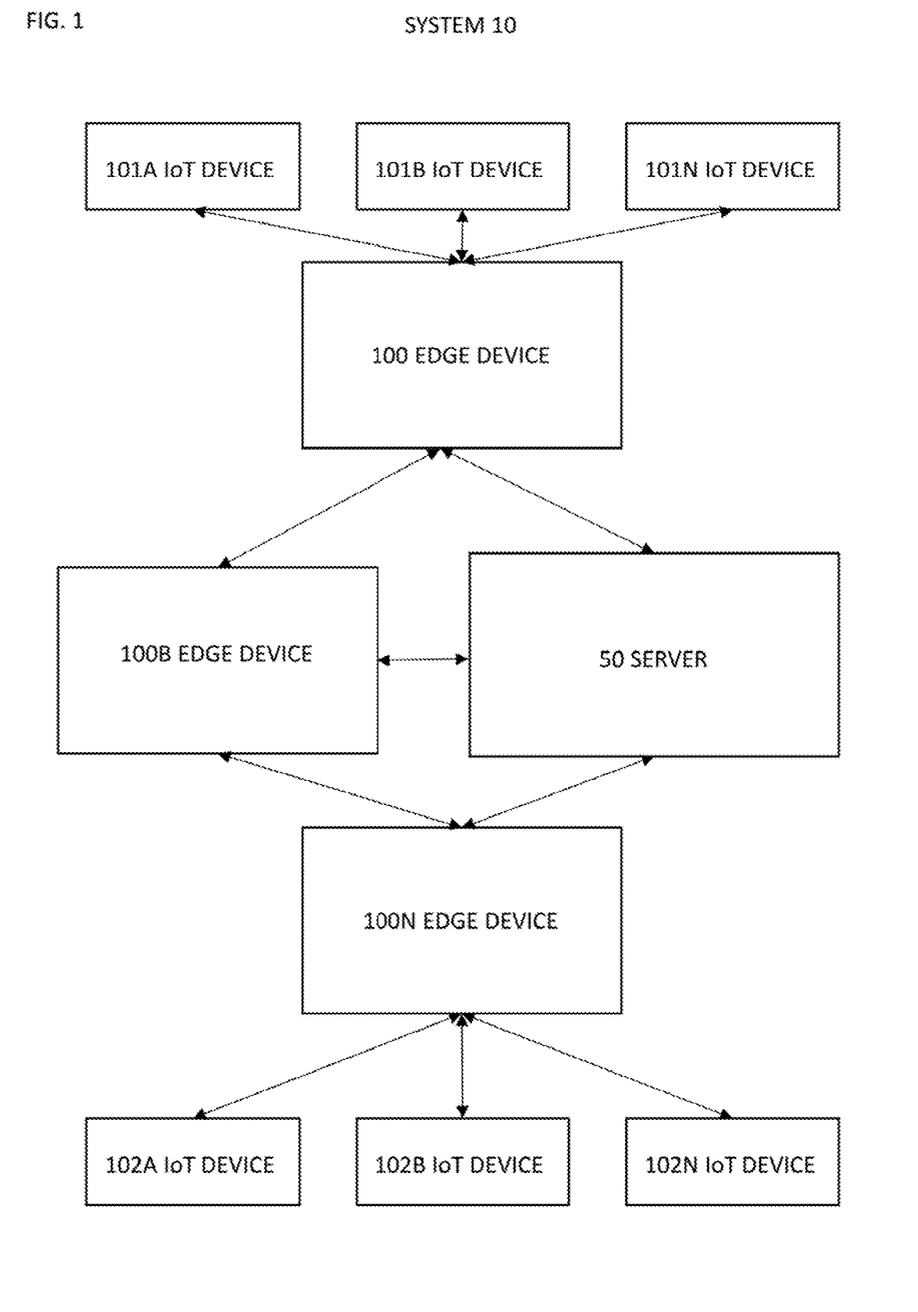
FIG. 1 is a block diagram depicting an example environment in which various examples may be implemented as a system that facilitates real-time processing of IoT data.

FIG. 1 is an example environment in which various examples may be implemented as a system that facilitates real-time processing of IoT data. In some examples, system that facilitates real-time processing of IoT data may include various components such as a set of edge devices (e.g., edge devices 100, 100B, . . . , 100N), a set of IoT devices 101A, 101B, . . . , 101N, 102A, 102B, . . . , 102N, a cloud server 50, and/or other devices communicably coupled to the set of edge devices. Each edge device (e.g., edge device 100) may communicate to and/or receive data from a cloud server 50, a set of IoT devices (e.g., devices 101A, 101B, . . . , 101N), a set of other edge devices (e.g., edge devices 101B, . . . , 101N), and/or other components in a network.

An edge device may comprise an access point, network switch, or other hardware device on a network that comprises a first physical processor (e.g., physical processor 110) and a second physical processor (e.g., second physical processor 115) that implement machine readable instructions to facilitate communication in the network. Physical processor 110 may be at least one central processing unit (CPU), microprocessor, and/or other hardware device suitable for performing the functionality described in relation to FIG. 1A. Second physical processor 115 may be at least one graphics processing unit (GPU), microprocessor, and/or other hardware device suitable for performing the functionality described in relation to FIG. 1A.

Cloud server 50 may be any server in a cloud network communicably coupled to an edge device that facilitates processing and/or storage of IoT data.

IoT devices 101A, 101B, . . . , 101N may be any IoT devices that are connected to the edge device. In some examples, IoT devices may be low-end devices that may be publicly deployed in a widespread manner. A low-end IoT device may comprise, for example, an IoT device that does not include complex hardware, separate security modules, or any specialized combination of hardware and programming that may facilitate analytical functionality by the IoT device. In some examples, the IoT devices may comprise one or multiple types of IoT devices on the network. Types of IoT devices may comprise, for example, cameras, traffic signals, coffee makers, air quality sensors, thermostats, printers, lightbulbs, other sensors, and/or any other IoT device.

According to various implementations, a system that facilitates real-time processing of IoT data and the various components described herein may be implemented in hardware and/or a combination of hardware and programming that configures hardware. Furthermore, in FIG. 1 and other Figures described herein, different numbers of components or entities than depicted may be used. In some examples, a system that facilitates real-time processing of IoT data may comprise a set of edge devices, with at least one edge device being connected to an IoT device.

Figure 1A:
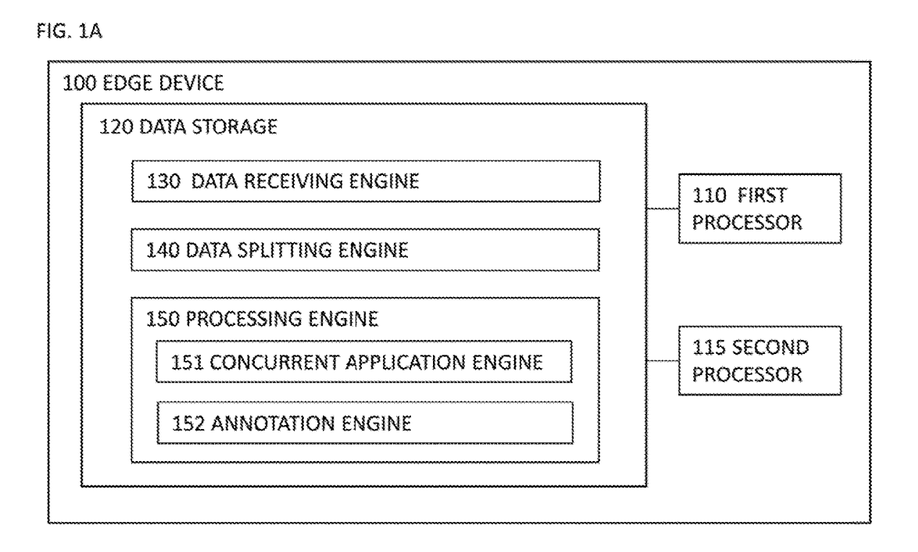
FIG. 1A is a block diagram depicting an example edge device for real-time processing of IoT data.

FIG. 1A is a block diagram depicting an example edge device for facilitating real-time processing of IoT data. In some examples, the example edge device 100 may comprise the edge device 100 of FIG. 1. Edge device, which facilitates real-time processing of data from IoT devices 101A, 101B, . . . , 101N, may comprise a physical processor 110, a data receiving engine 130, a data splitting engine 140, a processing engine 150, and/or other engines. In some examples, processing engine 150 may comprise a concurrent application engine 151, annotation engine 152, and/or other engines. The term "engine", as used herein, refers to a combination of hardware and programming that performs a designated function. As is illustrated with respect to FIGS. 1A-1B, the hardware of each engine, for example, may include one or both of a physical processor and a machine-readable storage medium, while the programming is instructions or code stored on the machine-readable storage medium and executable by the physical processor to perform the designated function. With respect to FIG. 1A, data receiving engine 130, data splitting engine 140 may include first physical processor 110, and data processing engine 150 may include second physical processor 115. With respect to FIG. 1B, data receiving engine 230, data splitting engine 240, decoding engine 260, and transmission engine 270 may include first physical processor 210, and data processing engine 250 may include second physical processor 215.

Data receiving engine 130 may receive a set of data from a first IoT device (e.g., IoT device 101A) communicably coupled to the edge device 100. The set of data may comprise a set of individual data packets. The data receiving engine 130 may receive the set of data at a bandwidth rate. In some examples, the set of data may comprise video data that includes a set of frames. In these examples, the data receiving engine may receive the set of data at a frame rate. In these examples, the data receiving engine 130 may decode the set of data from a video encoding performed by the IoT device (e.g., IoT device 101A) and may re-encode the video data to an encoding supported by the edge device 100 and/or servers 50 in the network. For example, the data receiving engine 130 may receive a set of video data encoded in an HLS format and transmitted from the IoT device (e.g., IoT device 101A) using an RTMP protocol. The data receiving engine 130 may decode the set of video data and re-encode the set of video data to a supported format (e.g., FFMPEG, and/or other predetermined format). Data receiving engine may perform other pre-processing of the set of data as well.

The data splitting engine 140 may split the set of data into a set of individual data packets. In some examples, the data splitting engine 140 may split the data responsive to performing pre-processing on the data. In examples in which the set of data comprise video data, the data splitting engine 140 may split the video data into a set of frames. In these examples, the data splitting engine 140 may split the video data into a set of frames responsive to decoding the video data. Responsive to splitting the set of data, data splitting engine 140 may then cause the split data to be sent to the processing engine 150, Processing engine 150 may process the set of individual data packets. The processing engine 150 may determine a number of the plurality of instances of the second physical processor 115 to use in parallel to process the set of individual data packets. The processing engine 150 may determine the number of the plurality of instances based on a bandwidth rate at which the data packets are being received, based on a number of processor cores available via the physical processor 115, based on a predetermined or required output rate of the data packets, based on a frame rate of the set of data (where the set of data comprises video data), and/or based on other factors.

In some examples, the processing engine 150 may determine the learning model to apply to the set of data. The processing engine 150 may determine the model based on a single model being stored in the storage medium 120. In examples in which multiple models may be stored in the storage medium 120, the processing engine 150 may determine the learning model to apply based on a set of characteristics of the set of data, on a type of analysis to be performed on the set of data, on a data type, a data source, and/or based on other factors. In some examples, the processing engine 150 may apply multiple learning models, where each model may be applied to a different subset of the set of data, or multiple models may be applied to the same subsets of the set of data based on the factors. In some examples, the learning model may comprise a regional-based convolutional neural network and/or other type of learning model. In some examples, the processing model may receive updated learning models from the server 50 and/or other device in the network.

The processing engine 150 may apply the same learning model to each of the individual data packets processed by an instance of the physical processor 115.

In some examples, processing engine 150 may comprise concurrent application engine 151, annotation engine 152, and/or other engines.

The concurrent application engine 151 may concurrently apply, by a plurality of instances of the second physical processor 115, a learning model to each of a corresponding plurality of data packets from the set of individual data packets (or individual frames in examples in the set of data comprises video data). For example, the processing engine 150 may load second physical processor 115 with a plurality of instances of the learning model, such that each of a set of cores of the second physical processor 115 may apply a respective instance of the learning model to a corresponding individual data packet (or individual frame). Responsive to an instance of the second physical processor 115 applying the learning model to an individual data packet (or individual frame), the concurrent application engine 151 may receive a next data packet (or individual frame) of the set of individual data packet (or individual frame) for processing. For example, as data arrives in series via the data receiving engine 130 and is split by the data splitting engine 140 and transmitted to the processing engine 150, the processing engine 150 may send the next individual data packet (or individual frame) to a next unutilized instance of the second physical processor 115 for processing, may determine a next instance of the second physical processor 115 based on a load balancing algorithm, and/or may otherwise determine a next instance of the second physical processor 115.

The annotation engine 152 may annotate, by a subset of the plurality of instances of the second physical processor 115, a corresponding subset of the plurality of data packets (or individual frames) with a corresponding output from the concurrent application of the learning model. In some examples, the annotation engine 152 may annotate a data packet by adding a visual effect, text, metadata, and/or other information to an individual data packet (or individual frame). The annotation engine 152 may determine the information to annotate to the individual data packet (or individual frame) based on the learning model being applied, based on inputs from an administrator or user of the network, based on a set of characteristics of the set of data, and/or based on other factors.

In some examples, responsive to annotating each of the plurality of data packets (or individual frames), the processing engine 150 may re-order the plurality of data packets to match an order in which the set of individual data packets (or individual frames) were processed. In these examples, the processing time of data packets (or individual frames) by the instances of the second physical processor 115 may not be constant (e.g., due to different packet (or frame) size, packet (or frame) data, and/or other factors). As such, the processing engine 150 may output the processed data packets (or frames) in an order that may not be the same as the order in which the individual data packets (or frames) were input. In these examples, the processing engine 150 may perform in-memory sorting (and/or other types of sorting) on the output data packets (or frames) to place them in the original order in which they were processed.

Responsive to re-ordering the plurality of data packets (or individual frames), the processing engine 150 may transmit the annotated, re-ordered plurality of data packets (or frames) to a server (e.g., server 50) communicably coupled to the edge device 100. In some examples, prior to transmitting the annotated, re-ordered plurality of data packets (or frames), the processing engine 150 may perform analytics or processing on the data packets (or frames). In examples in which the set of data comprises video data, the processing engine 150 may re-encode the annotated, re-ordered plurality of frames to a predetermined format. In these examples, the processing engine 150 may also performing further processing such as object detection, object tracking, object counting, visual click-through analysis for displays, augmented reality facilitation, prediction and estimation, and/or other processing.

In performing their respective functions, engines 130-152 may access storage medium 120 and/or other suitable database(s). Storage medium 120 may represent any memory accessible to the edge device 100 that can be used to store and retrieve data. Storage medium 120 and/or other databases communicably coupled to the edge device may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. The edge device 100 that facilitates real-time processing of IoT data may access storage medium 120 locally or remotely via a network.

Storage medium 120 may include a database to organize and store data. The database may reside in a single or multiple physical device(s) and in a single or multiple physical location(s). The database may store a plurality of types of data and/or files and associated data or file description, administrative information, or any other data.

Figure 1B:
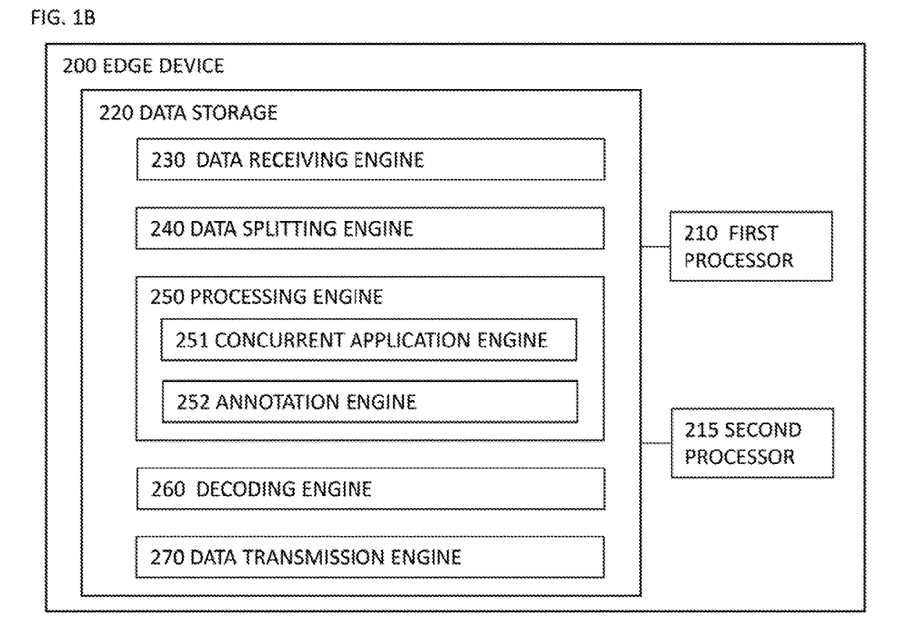
FIG. 1B is a block diagram depicting an example edge device for real-time processing of IoT data.

FIG. 1B is a block diagram depicting an example edge device 200 that facilitates real-time processing of IoT data. In some examples, example edge device 200 may comprise edge device 100 of FIG. 1. Edge device 200, which may facilitate real-time processing of IoT data may comprise a physical processor 210, data receiving engine 230, a data splitting engine 240, a processing engine 250, a decoding engine 260, a data transmission engine 270, and/or other engines. In some examples, processing engine 250 may comprise concurrent application engine 251, annotation engine 252, and/or other engines. In some examples, engines 230-270 represent engines 130-152, respectively.

Figure 2A:
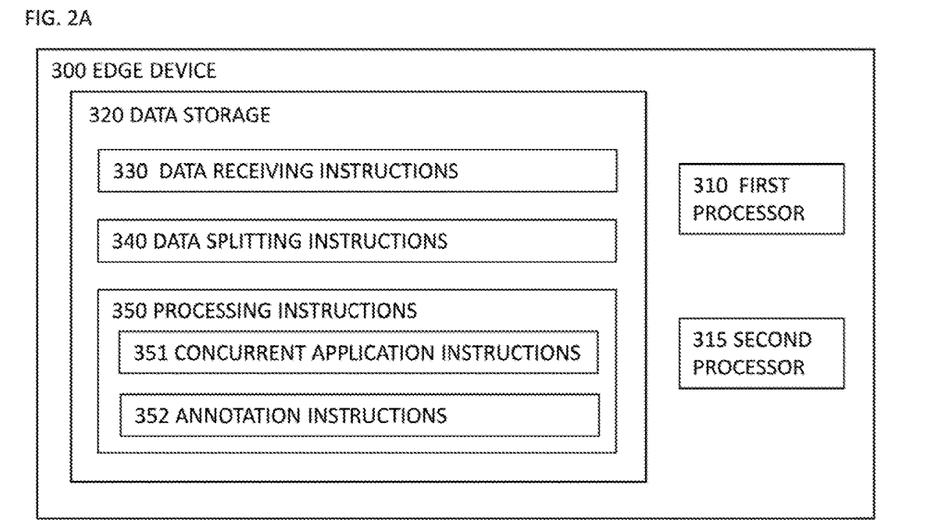
FIG. 2A is a block diagram depicting an example edge device for real-time processing of IoT data.

FIG. 2A is a block diagram depicting an example machine-readable storage medium 320 comprising instructions executable by a processor for real-time processing of IoT data.

In the foregoing discussion, engines 130-152 were described as combinations of hardware and programming. Engines 130-152 may be implemented in a number of fashions. Referring to FIG. 2A, the programming may be processor executable instructions 330-352 stored on a machine-readable storage medium 320 and the hardware may include a first processor 310 and a second processor 315 for executing those instructions. Thus, machine-readable storage medium 320 can be said to store program instructions or code that when executed by first processor 310 and second processor 315 implements an edge device that facilitates real-time processing of IoT data of FIG. 1.

In FIG. 2A, the executable program instructions in machine-readable storage medium 320 are depicted as data receiving instructions 330, data splitting instructions 340, processing instructions 350, and/or other instructions. In some examples, data processing instructions 350 may comprise concurrent application instructions 351, annotation instructions 352, and/or other instructions. Instructions 330-351 represent program instructions that, when executed, cause first processor 310 and second processor 215 to implement engines 130-152, respectively.

Figure 2B:
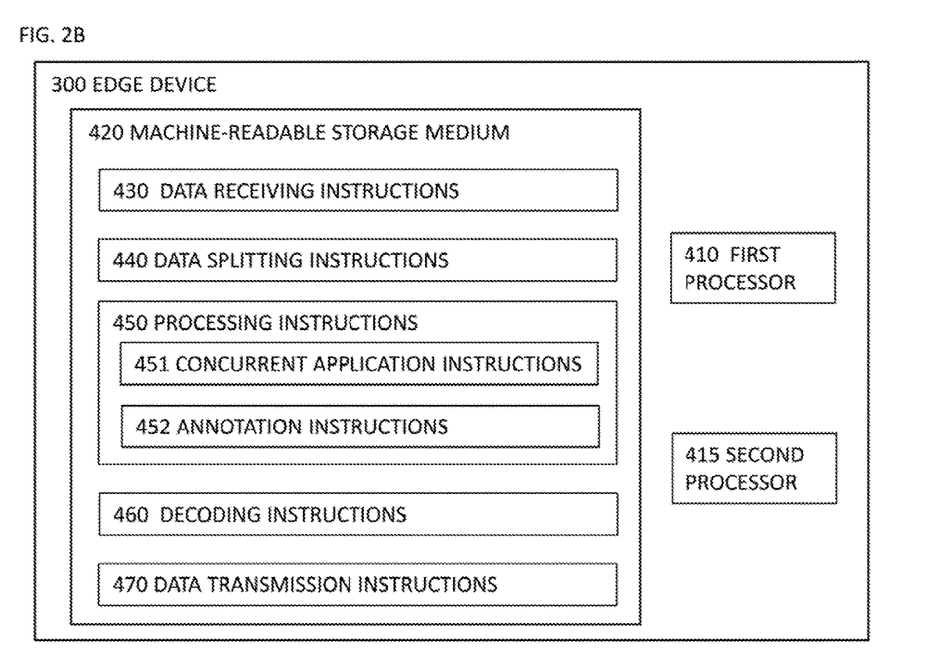
FIG. 2B is a block diagram depicting an example edge device for real-time processing of IoT data.

FIG. 2B is a block diagram depicting an example machine-readable storage medium 420 comprising instructions executable by a processor for real-time processing of IoT data.

In the foregoing discussion, engines 230-270 were described as combinations of hardware and programming. Engines 230-270 may be implemented in a number of fashions. Referring to FIG. 2B, the programming may be processor executable instructions 430-470 stored on a machine-readable storage medium 420 and the hardware may include a first processor 410 and a second processor 415 for executing those instructions. Thus, machine-readable storage medium 420 can be said to store program instructions or code that when executed by first processor 410 and second processor 415 implements an edge device that facilitates real-time processing of IoT data of FIG. 2B.

In FIG. 2B, the executable program instructions in machine-readable storage medium 420 are depicted as data receiving instructions 430, data splitting instructions 440, processing instructions 450, decoding instructions 460, data transmission instructions 470, and/or other instructions. In some examples, data processing instructions 450 may comprise concurrent application instructions 451, annotation instructions 452, and/or other instructions. Instructions 430-370 represent program instructions that, when executed, cause first processor 410 and second processor 415 to implement engines 220-270, respectively.

Machine-readable storage medium 320 (or machine-readable storage medium 420) may be any electronic, magnetic, optical, or other physical storage device that contains or stores executable instructions. In some implementations, machine-readable storage medium 320 (or machine-readable storage medium 420) may be a non-transitory storage medium, where the term "non-transitory" does not encompass transitory propagating signals. Machine-readable storage medium 320 (or machine-readable storage medium 420) may be implemented in a single device or distributed across devices. Likewise, processor 310 and processor 315 (or processor 410 and processor 415) may represent any number of physical processors capable of executing instructions stored by machine-readable storage medium 320 (or machine-readable storage medium 420). Processor 310 and processor 315 (or processor 410 and processor 415) may be integrated in a single device or distributed across devices. Further, machine-readable storage medium 320 (or machine-readable storage medium 420) may be fully or partially integrated in the same device as processor 310 and processor 315 (or processor 410 and processor 415), or it may be separate but accessible to that device and processor 310 and processor 315 (or processor 410 and processor 415).

In one example, the program instructions may be part of an installation package that when installed can be executed by processor 310 and processor 315 (or processor 410 and processor 415) to implement an edge device that facilitates real-time processing of IoT data. In this case, machine-readable storage medium 320 (or machine-readable storage medium 420) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 320 (or machine-readable storage medium 420) may include a hard disk, optical disk, tapes, solid state drives, RAM, ROM, EEPROM, or the like.

Processor 310 may be at least one central processing unit (CPU), microprocessor, and/or other hardware device suitable for retrieval and execution of instructions stored in machine-readable storage medium 320. Processor 310 may fetch, decode, and execute program instructions 330-340, and/or other instructions. As an alternative or in addition to retrieving and executing instructions, processor 310 may include at least one electronic circuit comprising a number of electronic components for performing the functionality of at least one of instructions 330-340, and/or other instructions.

Processor 315 may be at least one graphics processing unit (GPU), microprocessor, and/or other hardware device suitable for retrieval and execution of instructions stored in machine-readable storage medium 320. Processor 315 may fetch, decode, and execute program instructions 350-352, and/or other instructions. As an alternative or in addition to retrieving and executing instructions, processor 315 may include at least one electronic circuit comprising a number of electronic components for performing the functionality of at least one of instructions 350-352, and/or other instructions.

Processor 410 may be at least one central processing unit (CPU), microprocessor, and/or other hardware device suitable for retrieval and execution of instructions stored in machine-readable storage medium 420. Processor 410 may fetch, decode, and execute program instructions 430-440, 460-470, and/or other instructions. As an alternative or in addition to retrieving and executing instructions, processor 410 may include at least one electronic circuit comprising a number of electronic components for performing the functionality of at least one of instructions 430-440, 460-470, and/or other instructions.

Processor 415 may be at least one graphics processing unit (GPU), microprocessor, and/or other hardware device suitable for retrieval and execution of instructions stored in machine-readable storage medium 420. Processor 415 may fetch, decode, and execute program instructions 450-452, and/or other instructions. As an alternative or in addition to retrieving and executing instructions, processor 415 may include at least one electronic circuit comprising a number of electronic components for performing the functionality of at least one of instructions 450-452, and/or other instructions.

FIG. 3 is a flow diagram depicting an example method for real-time processing of IoT data. The various processing blocks and/or data flows depicted in FIG. 3 (and in the other drawing figures such as FIGS. 3A, 3B, 4, 4A) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, the method of FIG. 3 as illustrated (and described in greater detail below) is meant be an example and, as such, should not be viewed as limiting. The method of FIG. 3 may be implemented in the form of executable instructions stored on a machine-readable storage medium, such as storage medium 420, and/or in the form of electronic circuitry.

In an operation 500, a set of data may be received from a first IoT device communicably coupled to the edge device. For example, the edge device 100 (and/or the data receiving engine 130, the data receiving instructions 330, or other resource of the edge device 100) may receive the set of data packet from the IoT device. The edge device 100 may receive the set of data from the IoT device in a manner similar or the same as that described above in relation to the execution of the data receiving engine 130, the data receiving instructions 330, and/or other resource of the edge device 100.

In an operation 510, the set of data may be split into a set of individual data packets. For example, the edge device 100 (and/or the data splitting engine 140, the data splitting instructions 340 or other resource of the edge device 100) may split the data. The edge device 100 may split the data in a manner similar or the same as that described above in relation to the execution of the data splitting engine 140, the data splitting instructions 340, and/or other resource of the edge device 100.

In an operation 520, the set of individual data packets may be processed. For example, the edge device 100 (and/or the processing engine 150, the processing instructions 350 or other resource of the edge device 100) may process the individual data packets. The edge device 100 may process the individual data packets in a manner similar or the same as that described above in relation to the execution of the processing engine 150, the processing instructions 350, and/or other resource of the edge device 100.

In some examples, operation 520 may comprise operations 521 and 522.

In an operation 521, a plurality of instances of the second physical processor of the edge computing device may concurrently apply a learning model to each of a corresponding plurality of data packets from the set of individual data packets. For example, the edge device 100 (and/or the concurrent application engine 151, the concurrent application instructions 351, or other resource of the edge device 100) may concurrently apply, by the plurality of instances of the second physical processor of the edge computing device a learning model to each of the corresponding plurality of data packets from the set of individual data packets. The edge device 100 may concurrently apply, by the plurality of instances of the second physical processor of the edge computing device a learning model to each of the corresponding plurality of data packets from the set of individual data packets in a manner similar or the same as that described above in relation to the execution of the concurrent application engine 151, the concurrent application instructions 351, and/or other resource of the edge device 100.

In an operation 522, a subset of the plurality of instances of the second physical processor may annotate a corresponding subset of the plurality of data packets with a corresponding output from the concurrent application of the learning model. For example, the edge device 100 (and/or the annotation engine 152, the annotation instructions 352, or other resource of the edge device 100) may annotate the corresponding subset of the plurality of data packets with the corresponding output from the concurrent application of the learning model. The edge device 100 may annotate the corresponding subset of the plurality of data packets with the corresponding output from the concurrent application of the learning model in a manner similar or the same as that described above in relation to the execution of the annotation engine 152, the annotation instructions 352, and/or other resource of the edge device 100.

FIG. 4 is a flow diagram depicting an example method for real-time processing of IoT data. The method of FIG. 4 as illustrated (and described in greater detail below) is meant to be an example and, as such, should not be viewed as limiting. The method of FIG. 4 may be implemented in the form of executable instructions stored on a machine-readable storage medium, such as storage medium 420, and/or in the form of electronic circuitry.

In an operation 600, a set of video data may be received from a first IoT device communicably coupled to the edge device. For example, the edge device 100 (and/or the data receiving engine 230, the data receiving instructions 430, or other resource of the edge device 100) may receive the set of video data from the IoT device. The edge device 100 may receive the set of video data from the IoT device in a manner similar or the same as that described above in relation to the execution of the data receiving engine 230, the data receiving instructions 430, and/or other resource of the edge device 100.

In an operation 610, the set of data may be split into a set of individual frames. For example, the edge device 100 (and/or the data splitting engine 240, the data splitting instructions 440, or other resource of the edge device 100) may split the data. The edge device 100 may split the data in a manner similar or the same as that described above in relation to the execution of the data splitting engine 240, the data splitting instructions 440, and/or other resource of the edge device 100.

In an operation 620, the set of individual frames may be transmitted to a second physical processor. For example, the edge device 100 (and/or the data splitting engine 240, the data splitting instructions 440, or other resource of the edge device 100) may transmit the set of individual frames. The edge device 100 may transmit the individual frames in a manner similar or the same as that described above in relation to the execution of the data splitting engine 240, the data splitting instructions 440, and/or other resource of the edge device 100.

In an operation 630, the set of individual frames may be processed. For example, the edge device 100 (and/or the processing engine 250, the processing instructions 450 or other resource of the edge device 100) may process the individual frames. The edge device 100 may process the individual frames in a manner similar or the same as that described above in relation to the execution of the processing instructions 450, the processing instructions 450, and/or other resource of the edge device 100.

In some examples, operation 630 may comprise operations 631 and 632.

In an operation 631, a plurality of instances of the second physical processor of the edge computing device may concurrently apply a learning model to each of a corresponding plurality of frames from the set of individual frames. For example, the edge device 100 (and/or the concurrent application instructions 451, the concurrent application instructions 451, or other resource of the edge device 100) may concurrently apply, by the plurality of instances of the second physical processor of the edge computing device a learning model to each of the corresponding plurality of frames from the set of individual frames. The edge device 100 may concurrently apply, by the plurality of instances of the second physical processor of the edge computing device a learning model to each of the corresponding plurality of frames from the set of individual frames in a manner similar or the same as that described above in relation to the execution of the concurrent application engine 251, the concurrent application instructions 451, and/or other resource of the edge device 100.

In an operation 632, a subset of the plurality of instances of the second physical processor may annotate a corresponding subset of the plurality of frames with a corresponding output from the concurrent application of the learning model. For example, the edge device 100 (and/or the annotation engine 252, the annotation instructions 452, or other resource of the edge device 100) may annotate the corresponding subset of the plurality of frames with the corresponding output from the concurrent application of the learning model. The edge device 100 may annotate the corresponding subset of the plurality of frames with the corresponding output from the concurrent application of the learning model in a manner similar or the same as that described above in relation to the execution of the annotation engine 242, the annotation instructions 452, and/or other resource of the edge device 100.

The foregoing disclosure describes a number of example implementations for real-time processing of IoT data. The disclosed examples may include systems, devices, computer-readable storage media, and methods for real-time processing of IoT data. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 3-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order.

Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for real-time processing of IoT data, the method comprising:
    receiving, by a first physical processor of an edge computing device, a set of data from a first IoT device communicably coupled to the edge computing device, the set of data comprising a set of video data;
    splitting, by the first physical processor, the set of data into a set of individual data packets;
    determining, by a second physical processor of the edge computing device, a number of a plurality of instances of the second physical processor for processing the set of individual data packets based on a frame rate of the set of video data and at least one of a number of processor cores available and a bandwidth rate at which the data packets are being received; and
    processing, by the second physical processor of the edge device, the set of individual data packets by:
    concurrently applying, by the plurality of instances of the second physical processor of the edge computing device, a learning model to each of a corresponding plurality of data packets from the set of individual data packets;
    annotating, by a subset of the plurality of instances of the second physical processor, a corresponding subset of the plurality of data packets with a corresponding output from the concurrent application of the learning model; and
    processing the annotated subset of the plurality of data packets by performing at least one of: object counting, visual click-through analysis, augmented reality facilitation, prediction, and estimation.

2. The method of claim 1, wherein the set of data is split responsive to decoding the set of video data.

3. The method of claim 1, wherein annotating a data packet comprises adding visual effects to an individual data packet.

4. The method of claim 1, further comprising:
    responsive to an instance of the second physical processor applying the learning model to an individual data packet, receiving, by the instance, a next data packet of the set of individual data packets for processing.

5. The method of claim 1, further comprising:
    responsive to annotating each of the plurality of data packets, re-ordering the plurality of data packets to match an order in which the set of individual data packets were processed.

6. The method of claim 5, further comprising:
    responsive to re-ordering the plurality of data packets, transmitting the annotated, re-ordered plurality of data packets to a server communicably coupled to the edge device.

7. The method of claim 1, further comprising:
    determining the learning model to apply based on a set of characteristics of the set of data.

8. A non-transitory machine-readable storage medium comprising instructions executable by a physical processor of an edge device for real-time processing of IoT data, the machine-readable storage medium comprising:
    instructions to cause a first physical processor to receive a set of data from a first IoT device communicably coupled to the edge device, the set of data comprising a set of video data;
    instructions to cause the first physical processor to split the set of data into a set of individual data packets;
    instructions to cause a second physical processor to determine a number of a plurality of instances of the second physical processor for processing the set of individual data packets based on a frame rate of the set of video data and at least one of a number of processor cores available and a bandwidth rate at which the data packets are being received;

instructions to cause the second physical processor to process the set of individual data packets by:

concurrently applying, by the plurality of instances of the second physical processor, a learning model to each of a corresponding plurality of data packets from the set of individual data packets;

annotating, by a subset of the plurality of instances of the second physical processor, a corresponding subset of the plurality of data packets with a corresponding output from the concurrent application of the learning model; and processing the annotated subset of the plurality of data packets by performing at least one of: object counting, visual click-through analysis, augmented reality facilitation, prediction, and estimation; and instructions to transmit the processed set of individual data packets to a server communicably coupled to the edge device.

9. The non-transitory machine-readable storage medium of claim 8, wherein the instructions to cause the first processor to split the set of data comprises instructions to split the set of data responsive to decoding the received set of data, and wherein the storage medium further comprises:
instructions to cause the processed set of individual data packets to be re-encoded.

10. The non-transitory machine-readable storage medium of claim 8, wherein the instructions to cause the second physical processor to annotate a data packet comprise:

instructions to cause the second physical processor to add visual effects to an individual data packet.

11. The non-transitory machine-readable storage medium of claim 8, further comprising:

instructions to cause the second physical processor to, responsive to an instance of the second physical processor applying the learning model to an individual data packet, receive, by the instance, a next data packet of the set of individual data packets for processing.

12. The non-transitory machine-readable storage medium of claim 8, further comprising:

instructions to cause the second physical processor to, responsive to annotating each of the plurality of data packets, re-order the plurality of data packets to match an order in which the set of individual data packets were processed.

13. A system for real-time processing of IoT data, the system comprising:

a first physical processor of an edge device that implements machine readable instructions that cause the system to:

receive a set of video data from a first IoT device communicably coupled to the edge device;

split the set of data into a set of individual frames including data packets;

transmit the set of individual frames to a second physical processor of the edge device, wherein the second physical processor is to implement machine readable instructions that cause the system to:

determine a number of a plurality of instances of the second physical processor for processing the set of individual frames based on a frame rate of the set of video data and at least one of a number of processor cores available and a bandwidth rate at which the data packets are being received; and process the set of individual frames by:

concurrently applying, by the plurality of instances of the second physical processor, a learning model to each of a corresponding plurality of frames from the set of individual frames;

annotating, by each of the plurality of instances of the second physical processor, each of the plurality of frames with a corresponding output from the concurrent application of the learning model; and processing the annotated plurality of frames by performing at least one of: object counting, visual click-through analysis, augmented reality facilitation, prediction, and estimation.

14. The system of claim 13, wherein the first physical processor implements machine readable instructions to cause the system to:

split the set of data into the set of individual frames responsive to decoding the received set of data; and re-encode the processed set of data.

15. The system of claim 13, wherein the second physical processor implements machine readable instructions to cause the system to:

annotate an individual frame by adding visual effects to the individual frame.

16. The system of claim 13, wherein the second physical processor implements machine readable instructions to cause the system to:

responsive to an instance of the second physical processor applying the learning model to an individual frame, receive, by the instance, a next frame of the set of frames for processing.

17. The system of claim 13, wherein the second physical processor implements machine readable instructions to cause the system to:

responsive to annotating each of the plurality of frames, re-order the plurality of frames to match an order in which the set of individual frames were processed.

* * * * *